(12) United States Patent
Maresh et al.

(10) Patent No.: US 7,377,393 B2
(45) Date of Patent: May 27, 2008

(54) APPARATUS FOR PROTECTING PRODUCTS FROM DAMAGE DURING SHIPMENT

(75) Inventors: Mark Edmund Maresh, Phoenix, AZ (US); Eric Allen Stegner, Durham, NC (US); Robert William Stegner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 11/469,547

(22) Filed: Sep. 1, 2006

(65) Prior Publication Data

US 2008/0056839 A1 Mar. 6, 2008

(51) Int. Cl.
*B65D 45/00* (2006.01)

(52) U.S. Cl. .................. 206/522; 410/119; 410/125

(58) Field of Classification Search ........... 410/118, 410/119, 121, 125; 206/522, 593; 383/3, 383/25
See application file for complete search history.

(56) References Cited

U.S. PATENT DOCUMENTS

| | | | |
|---|---|---|---|
| 3,145,853 A | 8/1964 | Langenberg | |
| 3,199,689 A | 8/1965 | Feldkamp | |
| 3,462,027 A | 8/1969 | Puckhaber | |
| 3,762,580 A | 10/1973 | Melsek | |
| 3,847,091 A * | 11/1974 | Holt | 410/119 |
| 3,987,736 A | 10/1976 | Miller | |
| 4,013,018 A * | 3/1977 | Hansen et al. | 410/40 |
| 5,678,969 A | 10/1997 | Farrell et al. | |
| 5,819,943 A | 10/1998 | Depuy | |
| 6,457,921 B1 | 10/2002 | Freeman | |
| 6,537,003 B1 | 3/2003 | Rostoker | |
| 6,746,190 B2 | 6/2004 | Freeman | |
| 6,769,848 B2 | 8/2004 | Rostoker | |
| 2003/0165368 A1 | 9/2003 | Rostoker | |

* cited by examiner

*Primary Examiner*—Jacob K Ackun, Jr.
(74) *Attorney, Agent, or Firm*—Daniel E. McConnell; Gregory M. Dounikoff

(57) ABSTRACT

An arrangement of securing frame assemblies is provided within a shipping enclosure and engaging packages being handled. The frame assemblies have rigid frame members and distensible bags mounted on the frames. The distensible bags are, in use, distended as by being inflated or otherwise filled with a pressurized fluid to engage and secure freight.

9 Claims, 3 Drawing Sheets

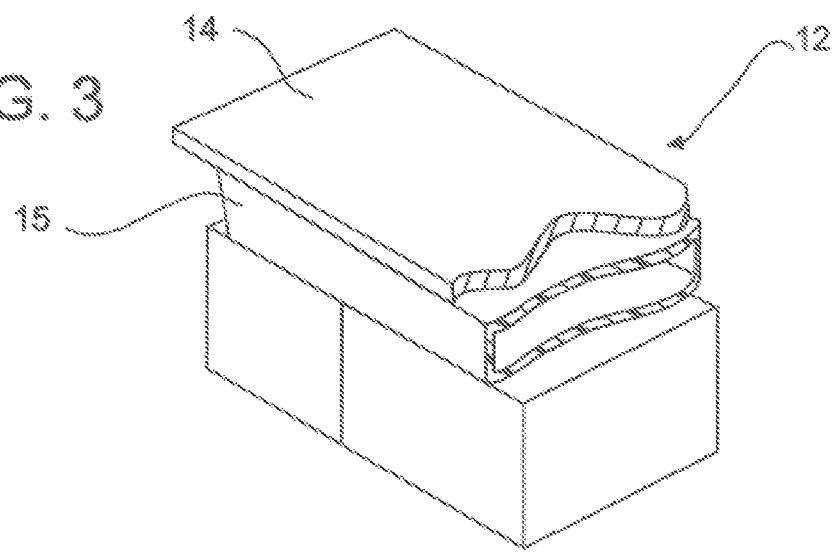
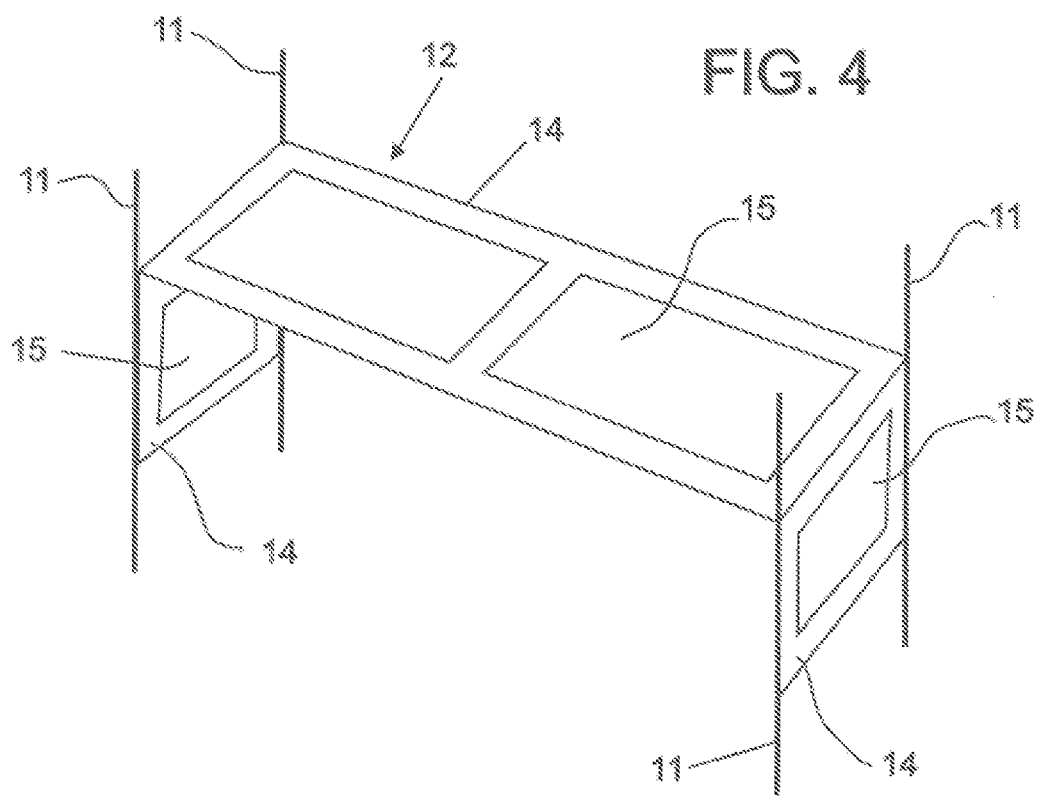

APPARATUS FOR PROTECTING PRODUCTS FROM DAMAGE DURING SHIPMENT

FIELD AND BACKGROUND OF INVENTION

This invention relates to apparatus and methods useful in shipping products, and particularly to protecting against damage to packages shipped in shipping enclosures such as sea or air freight containers, truck bodies including trailers, rail cars and the like.

The use of conventional load stabilization practices for shipment of goods in containers and truck bodies exposes loads to shifting, tipping and tumbling. Such unrestrained movement during handling causes damage to packaging and to goods packaged within, result in shipping losses.

Prior practices seeking to overcome this problem have included load bars, portable air bags, strapping and bracing against the interior wall surfaces of the enclosure using site built frames of wood or the like. Difficulties encountered include non-use of load bars due to theft and load bars that come loose during shipment causing freight damage. Air bags as previously proposed are expensive, difficult to use and are subject to over inflation. Air bags are often discarded after a single use and are deficient in holding a uniform pressure overtime, temperature variation and altitude changes. Site built bracing is a labor intensive manual process which increases loading and unloading time and are inconsistent across shipping locations and companies.

SUMMARY OF THE INVENTION

With the foregoing in mind, it is one purpose of this invention to improve the stabilization of freight within a shipping enclosure such as as sea or air freight containers, truck bodies including trailers, rail cars and the like. In realizing this purpose, an arrangement of securing frame assemblies is provided within a shipping enclosure and engage packages being handled. As described more fully hereinafter, provision is made for ready reuse of the securing frame assemblies and for ease of use in securing freight.

In accordance with this invention, the frame assemblies have rigid frame members and distensible bags mounted on the frames. The distensible bags are, in use, distended as by being inflated or otherwise filled with a pressurized fluid to engage and secure freight.

BRIEF DESCRIPTION OF DRAWINGS

Some of the purposes of the invention having been stated, others will appear as the description proceeds, when taken in connection with the accompanying drawings, in which:

FIG. 3 is a detailed view of certain components of a securing frame in accordance with this invention;

FIG. 4 is a skeletal perspective view similar to FIG. 2 of certain elements of this invention;

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
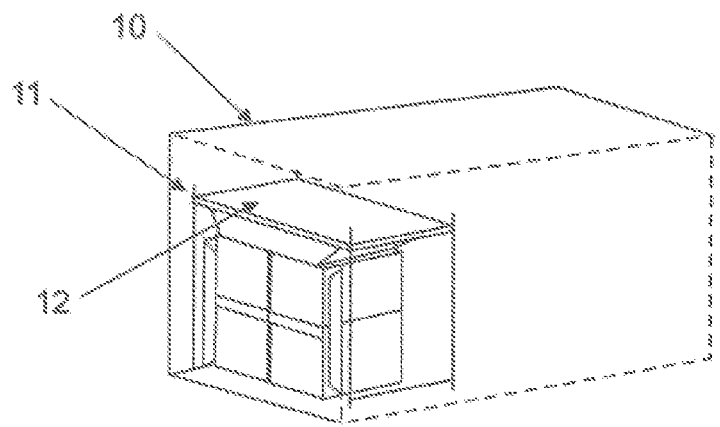
FIG. 1 is a perspective view of a shipping enclosure with the apparatus of this invention in place.
Figure 2:
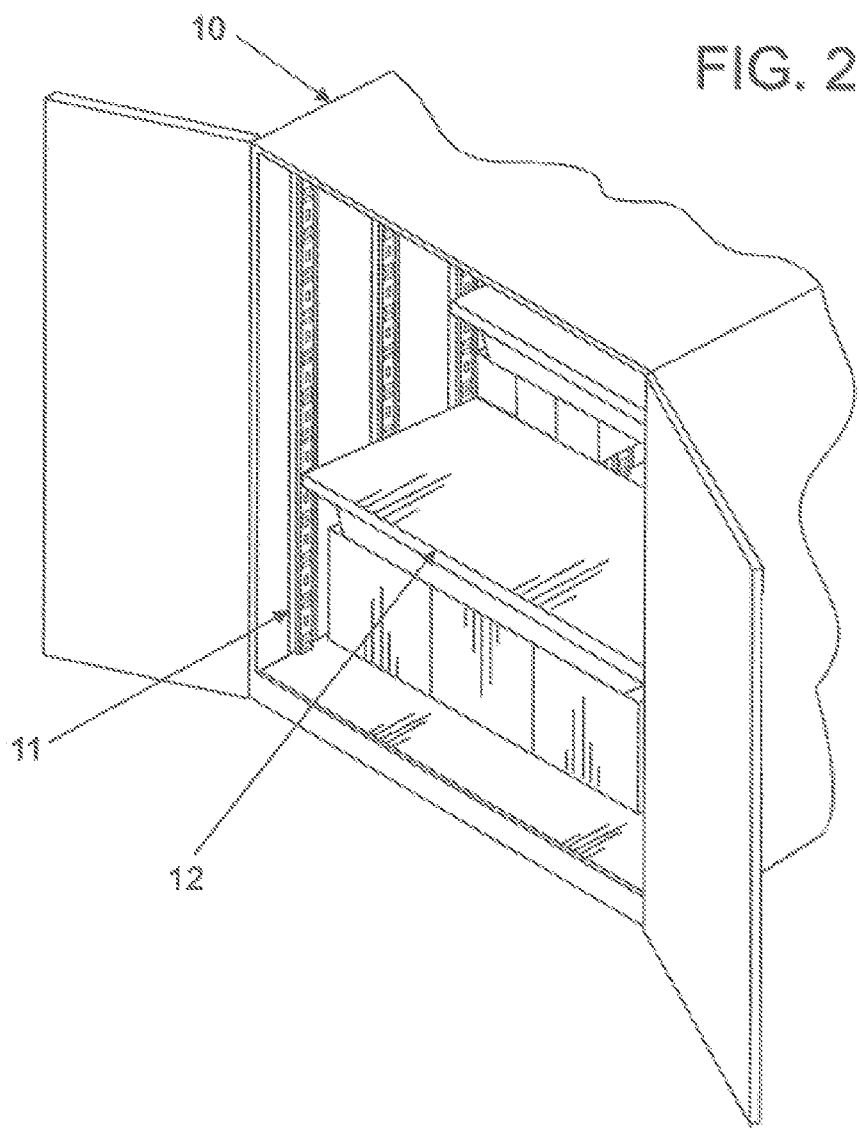
FIG. 2 is an enlarged view similar to FIG. 1 showing greater detail of one implementation of the invention.
Figure 5:
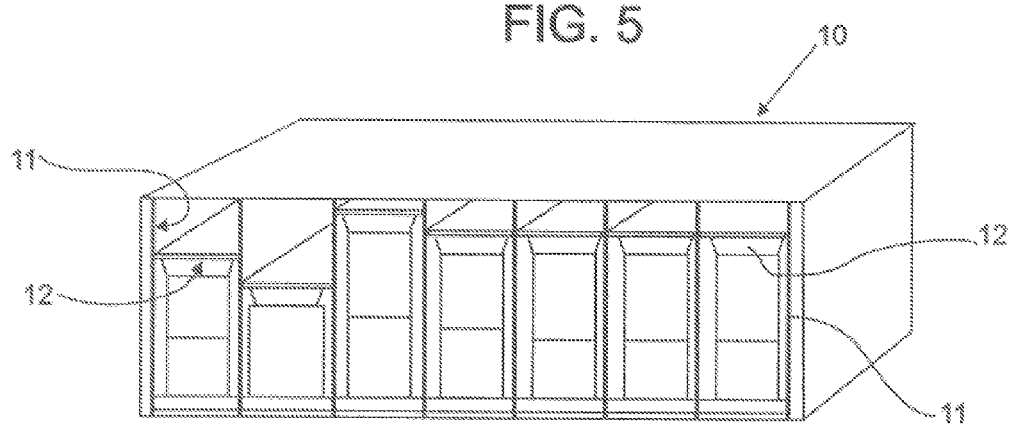
FIG. 5 is a perspective view of a shipping enclosure in accordance with this invention, with one side wall removed in order to show certain characteristics of the invention.
Figure 6:
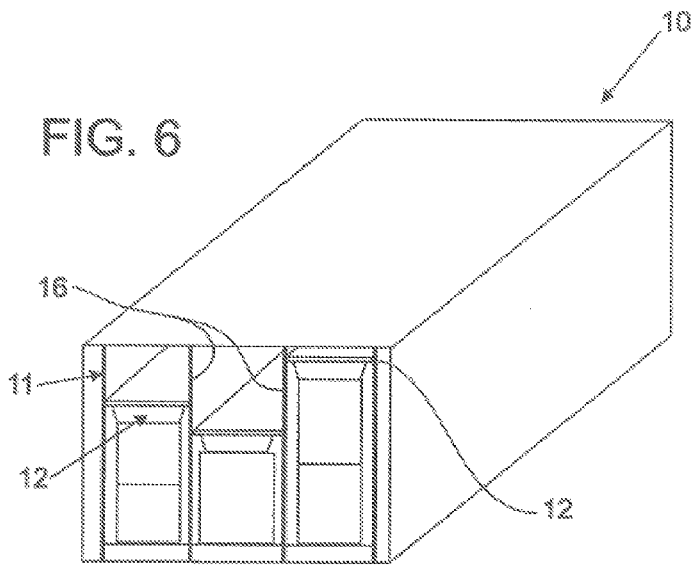
FIG. 6 is a view similar to FIGS. 1 and 2 illustrating certain modification in the invention.

Referring now more particularly to the accompanying drawings, FIGS. 1, 2 5 and 6 show a shipping enclosure 10 which is a portion of the invention here described. The enclosure 10 may be any one of a sea or air freight container, a truck body including trailers, a rail car and the like. For purposes of the illustration, the enclosure is simply an elongate box, having inward facing side walls, top and bottom walls. In FIGS. 1 and 2, the enclosure 10 is shown to have vertically extending rails 11 secured on or in the inwardly facing side walls. As will be understood from the prior art, such rails may extend within an enclosure vertically along side walls, horizontally along side walls, longitudinally along the top (ceiling) or bottom (floor) surfaces, or from side-to-side along the ceiling and floor surfaces. While only one orientation has here been shown, the present invention contemplates that any of the mentioned orientations and combinations of them may be present in—and used as described hereinafter—in a shipping enclosure in which the present invention is implemented.

In accordance with this invention, a securing frame 12 (or frames—a plurality will commonly be employed as will become more clear hereinafter) is provided which engages packages disposed within the enclosure for shipment and secures the packages against damage otherwise possibly occurring. The frames and frames 12 are shown in all of the accompanying Figures. However, FIGS. 3 and 4 are particularly useful in the present discussion. As there shown, the securing frame 12 has a rigid frame 14 engaging the fastener rails 11 within the enclosure 10 and a distensible bag 15 mounted on the rigid frame 14 and engaging packages disposed for shipment when distended. The rigid frame is preferably constructed with metal members that impart substantial rigidity and have fixtures adapted to lock into the rails 11. The rigid frame has a rectangular configuration and the bag has a congruent configuration. The rigid frame 14 may be stored out of goods engagement within the enclosure 10 when not needed to secure a load, as during loading or unloading of goods or transport of an empty enclosure. That is, the frame may be raised to the ceiling of the enclosure and secured there so as to be out of the way.

In accordance with the present invention, and as shown in FIG. 4, the frame preferably includes side portions disposed adjacent the side walls of the enclosure. These elements come into play as described hereinafter. The side portions have second and third inflatable stabilizing devices in the form of distensible bags mounted on the frame, the second and third bags being disposed adjacent interior side surfaces of the enclosure.

In some implementations, the provision of floor and ceiling rails in the shipping enclosure enable the use of intermediate vertical spacer rails 16 (FIG. 6) extending between the bottom and top inwardly facing surfaces (floor and ceiling) of the shipping enclosure 10 and spaced between opposite side walls of the shipping enclosure. In this implementation, the securing frames may extend between one side wall of the shipping enclosure and one of the spacer rails or between a pair of spacer rails. This gives a finer granularity to the division of space within the enclosure, accommodating packages of varying and smaller sizes while realizing the advantages of the present invention. Where this implementation is chosen, the frames are of smaller dimensions so as to achieve both the vertical and lateral restraints contemplated.

Turning now to the manner of restraint imposed on goods in practicing this invention, packages are loaded into the enclosure with the frames stowed out of engagement with the goods. The frames are then moved into position engaging the goods and locked into the relevant rails provided within the enclosure. The distensible bag is then distended with an appropriate pressurized fluid, which may be compressed air. This inflation, if air is chosen, may be provided by any convenient source, including any air compressor included in the transport vehicle, as may be the case with a truck. Where such an air source is available, the inflation may be monitored by a pressure regulator or the like and adjusted as necessary for climatic changes or bag leakage. Preferably, pressure sensing values are used to permit controlling the force exerted against packages during shipment.

As will be understood, the distensible bags fil voids otherwise possible present due to variance in package size and loading arrangements. This occurs while a more uniform securing force is applied to the distributed goods within the enclosure 10.

In the drawings and specifications there has been setforth a preferred embodiment of the invention and, although specific terms are used, the description thus given uses terminology in a generic and descriptive sense only and not for purposes of limitation.

What is claimed is:

1. Apparatus comprising:
    a shipping enclosure having fastener rails secured to the inward facing walls thereof; and
    a securing frame which engages packages disposed within the enclosure for shipment and secures the packages against damage otherwise possibly occurring; said securing frame having
    a rigid frame engaging said fastener rails; and
    a distensible bag mounted on said rigid frame and engaging packages disposed for shipment when distended.

2. Apparatus according to claim 1 wherein said bag is inflatable.

3. Apparatus according to claim 1 wherein said rigid frame has a rectangular configuration and said bag has a congruent configuration.

4. Apparatus according to claim 1 wherein said fastener rails extend vertically of inwardly facing side walls of said shipping enclosure.

5. Apparatus according to claim 4 wherein said securing frame spans from one side wall of said shipping enclosure to the opposite side wall of said shipping enclosure.

6. Apparatus according to claim 4 wherein said securing frame is positionable at varying heights within said shipping enclosure.

7. Apparatus according to claim 1 further comprising vertical spacer rails extending between the bottom and top inwardly facing surfaces of said shipping enclosure and spaced between opposite side walls of said shipping enclosure and further wherein said securing frame extends between one sidewall of said shipping enclosure and one of said spacer rails.

8. Apparatus according to claim 1 further comprising a plurality of vertical spacer rails extending between the bottom and top inwardly facing surfaces of said shipping enclosure and spaced between opposite side walls of said shipping enclosure and further wherein said securing frame extends between a pair of said spacer rails.

9. Apparatus according to claim 1 further comprising second and third distensible bags mounted on said frame, said first mentioned bag being disposed adjacent an interior upper surface of said enclosure and said second and third bags being disposed adjacent interior side surfaces of said enclosure.

* * * * *